· US009934893B2

(12) United States Patent
Murakami et al.

(10) Patent No.: US 9,934,893 B2
(45) Date of Patent: Apr. 3, 2018

(54) SHUNT RESISTOR AND METHOD FOR MANUFACTURING SAME

(71) Applicant: Suncall Corporation, Kyoto-shi, Kyoto-fu (JP)

(72) Inventors: Kenji Murakami, Kyoto (JP); Hiroya Kobayakawa, Kyoto (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 15/545,258

(22) PCT Filed: Apr. 11, 2016

(86) PCT No.: PCT/JP2016/061697
§ 371 (c)(1),
(2) Date: Jul. 20, 2017

(87) PCT Pub. No.: WO2016/175016
PCT Pub. Date: Nov. 3, 2016

(65) Prior Publication Data
US 2018/0005734 A1 Jan. 4, 2018

(30) Foreign Application Priority Data
Apr. 28, 2015 (JP) .................................. 2015-091883

(51) Int. Cl.
*H01C 1/14* (2006.01)
*H01C 17/242* (2006.01)
(Continued)

(52) U.S. Cl.
CPC ......... *H01C 17/242* (2013.01); *B23K 26/351* (2015.10); *B23K 26/362* (2013.01); *H01C 1/14* (2013.01)

(58) Field of Classification Search
CPC .... H01C 17/242; H01C 17/245; H01C 17/23; H01C 17/232; H01C 17/235; H01C 17/22
(Continued)

(56) References Cited

U.S. PATENT DOCUMENTS 5,015,989 A * 5/1991 Wohlfarth .............. H01C 17/24
219/121.69
5,214,407 A * 5/1993 McKim, Jr. ............ G01R 1/203
338/120
(Continued)

FOREIGN PATENT DOCUMENTS

JP 03-259501 A 11/1991
JP 04-280401 A 10/1992
(Continued)

OTHER PUBLICATIONS

Notification of Transmittal of Translation of the International Preliminary Report on Patentability issued in PCT/JP2016/061697, dated Nov. 9, 2017 (11 pages).
(Continued)

*Primary Examiner* — Kyung Lee
(74) *Attorney, Agent, or Firm* — Sterne, Kessler, Goldstein & Fox P.L.L.C.

(57) ABSTRACT

A shunt resistor according to the present invention includes a pair of electrode plates spaced apart from each other in a plate surface direction and a resistive alloy plate that connects the pair of electrode plates and that has a predetermined set resistance value. A surface of the resistive alloy plate is provided with a visually recognizable character string pattern that is formed by laser processing and that indicates the set resistance value of the resistive alloy plate, and a surface area and a carving depth of the character string pattern are set in such a manner that the resistive alloy plate has the set resistance value.

4 Claims, 1 Drawing Sheet

(51) Int. Cl.
*B23K 26/362* (2014.01)
*B23K 26/351* (2014.01)

(58) Field of Classification Search
USPC .................................................. 338/322, 195
See application file for complete search history.

(56) References Cited

U.S. PATENT DOCUMENTS

| | | | | |
|---|---|---|---|---|
| RE39,660 E | * | 5/2007 | Szwarc | H01C 7/06 219/216 |
| 8,531,264 B2 | * | 9/2013 | Li | H01C 7/06 338/195 |
| 2004/0216303 A1 | * | 11/2004 | Berlin | H01C 7/003 29/610.1 |
| 2011/0057764 A1 | * | 3/2011 | Smith | H01C 1/148 338/25 |
| 2012/0200383 A1 | * | 8/2012 | Lo | G01R 1/203 338/314 |
| 2013/0113600 A1 | * | 5/2013 | Smith | H01C 1/148 338/332 |

FOREIGN PATENT DOCUMENTS

| | | |
|---|---|---|
| JP | 08-083969 A | 3/1996 |
| JP | 10-032110 A | 2/1998 |
| JP | 2003/197402 A | 7/2003 |
| JP | 2003-197402 A | 7/2003 |
| JP | 2010-272712 A | 12/2010 |
| JP | 5374732 B2 | 10/2013 |

OTHER PUBLICATIONS

International Search Report issued in International Application No. PCT/JP2016/061697, dated Jun. 14, 2016.

* cited by examiner

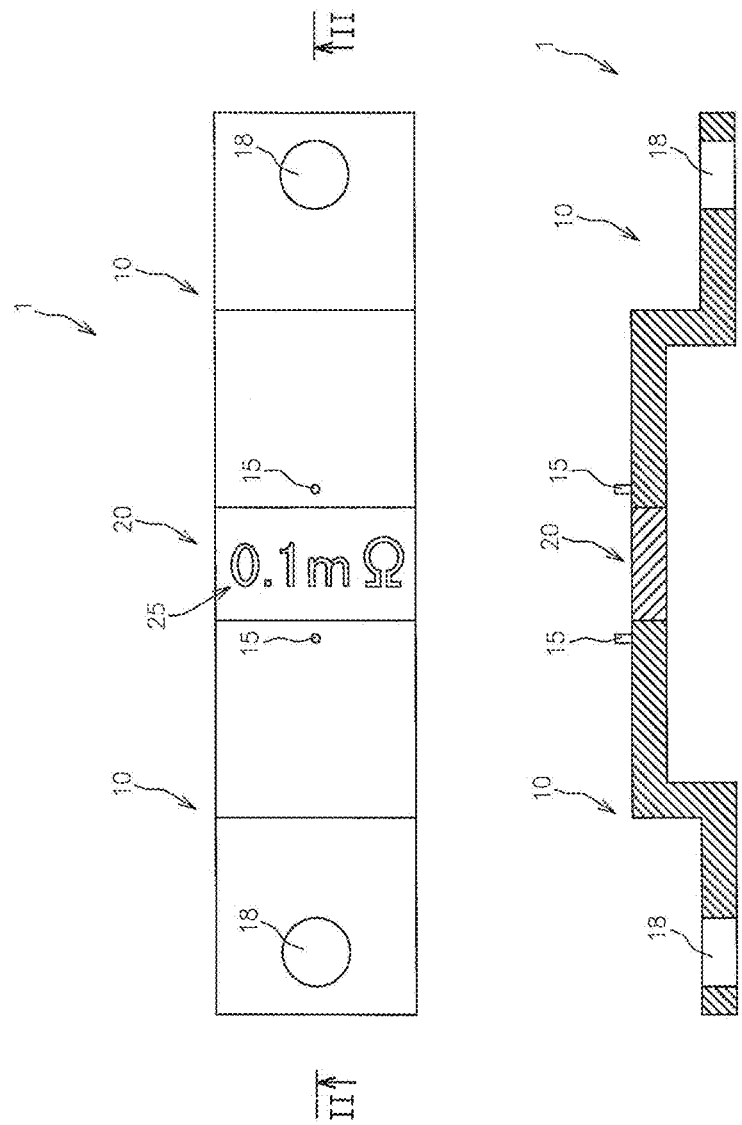

SHUNT RESISTOR AND METHOD FOR MANUFACTURING SAME

FIELD OF THE INVENTION

The present invention relates to a shunt resistor utilized to determinate a current value and a method for manufacturing the same.

BACKGROUND ART

The shunt resistor is a component that is serially connected to an electric circuit, which is the target of determining a current value, and is utilized when determining the current value of the circuit by measuring the voltage value across the shunt resistor. The shunt resistor is widely utilized in various fields such as the field of bus rings (bus bars) in rotary motors.

For example, Patent Literature 1 below proposes a method for manufacturing a shunt resistor, comprising forming an intermediate, which integrally has a pair of electrode parts and a connecting part connecting the pair of electrode parts, from a metal plate of Cu or the like having a predetermined thickness and width; joining a resistive alloy plate of a Cu—Mn alloy, a Ni—Cr alloy, or a Cu—Ni alloy to the pair of electrode parts so as to bridge the pair of electrode parts; and then cutting and removing the connecting part.

Also, Patent Literature 2 below proposes a method for obtaining a predetermined resistance value by joining a thick film resistor to a pair of electrode conductors, which are disposed to face each other on an insulating substrate, so as to connect the pair of electrode conductors, and laser-trimming the thick film resistor.

The manufacturing method described in Patent Literature 1 is advantageous in that the orientation of the resistive alloy plate attached to the pair of electrode parts can be stabilized.

Also, the method described in Patent Literature 2 is advantageous in that the resistance value can be adjusted in a highly precise manner.

Meanwhile, in general, shunt resistors with various resistance values are produced, and a shunt resistor with a suitable resistance value is utilized according to the specification of an electric circuit, which is the target of determining a current value.

In this case, shunt resistors are managed for each resistance value, and if the resistance value of one shunt resistor can be immediately verified, it is possible to prevent mistakenly selecting another shunt resistor during the work of attaching said one shunt resistor to an electric circuit as much as possible.

However, no prior-art documents including Patent Literatures 1 and 2 can be found that focus on such a viewpoint.

PRIOR ART DOCUMENT

Patent Literature

Patent Literature 1: JP 5374732B
Patent Literature 2: JP H10-032110A

DISCLOSURE OF THE INVENTION

The present invention has been conceived in view of such conventional art, and an object of the present invention is to provide a shunt resistor capable of reliably informing a user of a set resistance value. Also, an object of the present invention is to provide a shunt resistor manufacturing method capable of efficiently manufacturing the shunt resistor.

In order to achieve the object, the present invention provides a shunt resistor including a pair of electrode plates spaced apart from each other in a plate surface direction and a resistive alloy plate that connects the pair of electrode plates and that has a predetermined set resistance value, wherein the resistive alloy plate is provided at a surface with a visually recognizable character string pattern that is formed by laser processing and that indicates the set resistance value of the resistive alloy plate, and a surface area and a carving depth of the character string pattern are set in such a manner that the resistive alloy plate has the set resistance value.

According to the shunt resistor of the present invention, it is possible to reliably inform a user of the set resistance value of the resistive alloy plate, since the surface of the resistive alloy plate is provided with the visually recognizable character string pattern that is formed by laser processing and that indicates the set resistance value of the resistive alloy plate and the surface area and the carving depth of the character string pattern are set in such a manner that the resistive alloy plate has the set resistance value.

The present invention also provides a first manufacturing method of shunt resistor that includes a pair of electrode plates spaced apart from each other in a plate surface direction and a resistive alloy plate that connects the pair of electrode plates and that has a predetermined set resistance value, the first manufacturing method including a step of providing a resistor material in which the pair of electrode plates are connected to each other via the resistive alloy plate; a step of measuring an initial resistance value of the resistive alloy plate; a reference output laser processing step of carving a region, where a visually recognizable character string pattern indicating the set resistance value is to be formed, out of a surface of the resistive alloy plate so as to form the character string pattern, the laser processing being performed at such a laser output value that the carving depth is a predetermined reference depth; a step of measuring a character string pattern reference depth state resistance value of the resistive alloy plate that is in a state where the character string pattern has the reference depth; a step of calculating a reference changed resistance value of the resistive alloy plate that changes due to single reference output laser processing, based on the initial resistance value and the character string pattern reference depth state resistance value; and a step of performing reference depth laser processing only the necessary number of times calculated based on the reference changed resistance value and the difference between the character string pattern reference depth state resistance value and the set resistance value.

According to the first manufacturing method of shunt resistor, it is possible to efficiently manufacture the shut resistor with the character string pattern that indicates the set resistance value, since it includes the reference output laser processing step of carving the region, where the visually recognizable character string pattern indicating the set resistance value is to be formed, out of the surface of the resistive alloy plate so as to form the character string pattern, the laser processing being performed at such a laser output value that the carving depth is the predetermined reference depth, the step of measuring the character string pattern reference depth state resistance value of the resistive alloy plate that is in a state where the character string pattern has the reference depth, the step of calculating the reference changed resistance value of the resistive alloy plate that changes due to single reference output laser processing, based on the initial resistance value and the character string pattern reference depth state resistance value, and the step of performing reference depth laser processing only the necessary number of times calculated based on the reference changed resistance value and the difference between the character string pattern reference depth state resistance value and the set resistance value.

Further, the present invention provides a second manufacturing method of shunt resistor that includes a pair of electrode plates spaced apart from each other in a plate surface direction and a resistive alloy plate that connects the pair of electrode plates and that has a predetermined set resistance value, the second manufacturing method including a step of providing a resistor material in which the pair of electrode plates are connected to each other via the resistive alloy plate; a step of measuring an initial resistance value of the resistive alloy plate; and a step of calculating a laser output value capable of changing the resistance of the resistive alloy plate from the initial resistance value to the set resistance value, using data concerning a changed resistance value/a laser output that is provided for each of a plurality of expected set resistance values and that indicates a relationship between a size of a changed resistance value of the resistive alloy plate that changes due to the laser processing performed to carve a region, where the visually recognizable character string pattern indicating the set resistance value and having a set surface area is to be formed, out of the surface of the resistive alloy plate so that the character string pattern is formed and a size of the laser output, and then performing a laser processing with a laser having the calculated laser output value on the region where the character string pattern is to be formed.

According to the second manufacturing method of shunt resistor, it is possible to efficiently manufacture the shut resistor with the character string pattern that indicates the set resistance value, since it includes the step of calculating the laser output value capable of changing the resistance of the resistive alloy plate from the initial resistance value to the set resistance value, using data concerning a changed resistance value/a laser output that is provided for each of a plurality of expected set resistance values and that indicates a relationship between a size of the changed resistance value of the resistive alloy plate that changes due to the laser processing performed to carve a region, where the visually recognizable character string pattern indicating the set resistance value and having a set surface area is to be formed, out of the surface of the resistive alloy plate so that the character string pattern is formed and a size of the laser output, and then performing a laser processing with a laser having the calculated laser output value on the region where the character string pattern is to be formed.

Further, the present invention provides a third manufacturing method of shunt resistor that includes a pair of electrode plates spaced apart from each other in a plate surface direction and a resistive alloy plate that connects the pair of electrode plates and that has a predetermined set resistance value, the third manufacturing method including a step of providing a resistor material in which the pair of electrode plates are connected to each other via the resistive alloy plate; a step of measuring an initial resistance value of the resistive alloy plate; and a step of calculating a surface area of a character string pattern, which indicates the set resistance value in a visually recognizable manner, necessary for changing the resistance of the resistive alloy plate from the initial resistance value to the set resistance value by a laser processing with a laser having a reference output value, using data concerning a changed resistance value/a character string pattern surface area that is provided for each of a plurality of expected set resistance values and that indicates a relationship between a surface area of the character string pattern and a size of a changed resistance value of the resistive alloy plate that changes due to laser processing that carves by a laser having a reference output value a region, where the visually recognizable character string pattern indicating the set resistance value is to be formed, out of the surface of the resistive alloy plate so that the character string pattern is formed, and then forming the character string pattern by performing a laser processing with a laser having the reference output value so that the character string pattern has the calculated surface area.

According to the third manufacturing method of shunt resistor, it is possible to efficiently manufacture the shut resistor with the character string pattern that indicates the set resistance value, since it includes the step of calculating the surface area of the character string pattern, which indicates the set resistance value in a visually recognizable manner, necessary for changing the resistance of the resistive alloy plate from the initial resistance value to the set resistance value by a laser processing with a laser having the reference output value, using data concerning a changed resistance value/a character string pattern surface area that is provided for each of a plurality of expected set resistance values and that indicates a relationship between a surface area of the character string pattern and a size of a changed resistance value of the resistive alloy plate that changes due to laser processing that carves by a laser having the reference output value a region, where the visually recognizable character string pattern indicating the set resistance value is to be formed, out of the surface of the resistive alloy plate so that the character string pattern is formed, and then forming the character string pattern by performing a laser processing with a laser having the reference output value so that the character string pattern has the calculated surface area.

BRIEF DESCRIPTION OF THE DRAWINGS

FIG. 1 is a plan view of a shunt resistor according to one embodiment of the present invention.

FIG. 2 is a cross-sectional view taken along the line II-II in FIG. 1.

EMBODIMENT FOR CARRYING OUT THE INVENTION

Below, one embodiment of the shunt resistor according to the present invention will now be described with reference to the attached drawings.

FIG. 1 shows a plan view of a shunt resistor 1 according to this embodiment.

Also, FIG. 2 shows a cross-sectional view of the shunt resistor 1 taken along the line II-II in FIG. 1.

As shown in FIGS. 1 and 2, the shunt resistor 1 includes a pair of electrode plates 10, 10 spaced apart from each other in the plate surface direction, and a resistive alloy plate 20 connecting the pair of electrode plates 10, 10.

The electrode plates 10 are made from electroconductive material, and, for example, a metal plate of Cu is suitably utilized.

As shown in FIGS. 1 and 2, the pair of electrode plates 10, 10 respectively have a pair of detection terminals 15, 15 positioned adjacent to the resistive alloy plate 20 that connects the electrode plates 10, 10.

Reference number 18 in FIGS. 1 and 2 indicates a fastening through-hole used to secure the shunt resistor to a predetermined position.

The resistive alloy plate 20 has a predetermined set resistance value.

For example, a Cu—Mn alloy, a Ni—Cr alloy, or a Cu—Ni alloy is suitably utilized as the resistive alloy plate 20.

In this embodiment, as shown in FIG. 1, the surface of the resistive alloy plate 20 has a visually recognizable character string pattern 25 that is formed by laser processing and that indicates the set resistance value of the resistive alloy plate 20.

In the depicted embodiment, the resistance value of the resistive alloy plate 20 is 0.1 mΩ and, accordingly, "0.1 mΩ" is formed by laser processing as the character string pattern 25.

Specifically, by regulating the surface area and the carving depth of the character string pattern 25, the resistance value of the resistive alloy plate 20 is regulated from the initial resistance value (the resistance value before laser processing) to the set resistance value.

That is to say, by carving the character string pattern 25 having a predetermined surface area to a predetermined depth by laser processing, the cross-sectional area of the resistive alloy plate 20 is reduced, and the resistance value of the resistive alloy plate 20 increases from the initial resistance value to the set resistance value in accordance with this reduced cross-sectional area.

According to the shunt resistor 1 having such a configuration, the surface area and the carving depth of the character string pattern 25 are regulated so as to match the resistance value of the resistive alloy plate 20 and a desired set resistance value, and it is thus possible to regulate the shunt resistor 1 to a desired set resistance value without resulting in increased manufacturing costs and, moreover, possible to reliably inform a user of the set resistance value of the resistive alloy plate 20.

Accordingly, it is possible to efficiently perform management work when managing shunt resistors for each resistance value and, moreover, it is possible to prevent mistakenly selecting another shunt resistor as much as possible when attaching the aforementioned shunt resistor to an electric circuit.

Next, methods for manufacturing the shunt resistor 1 are described.

First, a first manufacturing method is described.

The first manufacturing method includes:

a step of providing a resistor material in which the pair of electrode plates 10, 10 are connected to each other via the resistive alloy plate 20;

a step of measuring the initial resistance value of the resistive alloy plate 20;

a reference output laser processing step of carving a region, where the visually recognizable character string pattern 25 indicating a set resistance value (such as 0.1 mΩ) is to be formed, out of the surface of the resistive alloy plate 20 so as to form the character string pattern 25, wherein laser processing is performed at such a laser output value that the carving depth is a predetermined reference depth;

a step of measuring the resistance value (a character string pattern reference depth state resistance value) of the resistive alloy plate 20 that is in a state where the character string pattern 25 has the reference depth due to reference output laser processing;

a step of calculating a reference changed resistance value of the resistive alloy plate that changes due to single reference output laser processing, based on the initial resistance value and the character string pattern reference depth state resistance value; and a step of performing reference depth laser processing only the necessary number of times calculated based on the reference changed resistance value and the difference between the character string pattern reference depth state resistance value and the set resistance value.

For example, there may be a case where the set resistance value is 0.100 mΩ, and the initial resistance value of the resistor material (the resistance value before laser processing is performed) is 0.05 mΩ, and the character string pattern reference depth state resistance value is 0.06 mΩ.

In this case, the reference changed resistance value is 0.01 mΩ(=0.06 mΩ-0.05 mΩ), and the resistance value of the resistive alloy plate 20 can become 0.100 mΩ, which is the set resistance value, by performing the reference depth laser processing only four times, which is the necessary number of times calculated based on the reference changed resistance value (0.01 mΩ) and the difference (0.04 mΩ) between the character string pattern reference depth state resistance value (0.06 mΩ) and the set resistance value (0.100 mΩ).

According to the first manufacturing method, the shunt resistor 1 that has a desired set resistance value and is capable of reliably informing a user of the set resistance value can be reliably and efficiently manufactured.

In place of the first manufacturing method, the shunt resistor 1 can also be manufactured by a second manufacturing method having the following configuration.

The second manufacturing method includes the step of providing a resistor material, the step of measuring the initial resistance value of a resistive alloy plate, and, subsequent to these steps, a laser processing step of calculating a laser output value, which is used when performing laser processing, using data concerning a changed resistance value/a laser output provided for each of the plurality of expected set resistance values, and then forming the character string pattern 25 using a laser having the laser output value.

The data concerning a changed resistance value/a laser output is data indicating the relationship between the size of the changed resistance value of the resistive alloy plate that changes due to laser processing performed to carve a region, where the visually recognizable character string pattern 25 that indicates a set resistance value and has a set surface area is to be formed, out of the surface of the resistive alloy plate 20 such that the character siring pattern 25 is formed and the size of the laser output, and is obtained in advance through experimentation or the like.

In the laser processing step in the second manufacturing method, a laser output value necessary during the subsequent laser processing is calculated according to the resistance value that should be changed and that is obtained based on the difference between the initial resistance value and the set resistance value and to the data concerning a changed resistance value/a laser output, and laser processing is performed with a laser having the laser output value on the region where the character string pattern 25 is to be formed.

According to the second manufacturing method as well, the shunt resistor 1 that has a desired set resistance value and is capable of reliably informing a user of the set resistance value can be reliably and efficiently manufactured.

In place of the first and second manufacturing methods, the shunt resistor 1 can also be manufactured by a third manufacturing method having the following configuration.

The third manufacturing method includes the step of providing a resistor material, the step of measuring the initial resistance value of the resistive alloy plate 20, and, subsequent to these steps, a laser processing step of calculating the surface area of a character string pattern, which should be laser-processed when performing the subsequent laser processing with a laser having a predetermined reference output value, using data concerning a changed resistance value/a character string pattern surface area provided for each of the plurality of expected set resistance values, and then forming the character string pattern 25 so as to have the surface area by the laser having the reference output value.

The data concerning a changed resistance value/a character string pattern surface area is data indicating the relationship between the surface area of the character string pattern 25 and the size of the changed resistance value of the resistive alloy plate that changes due to laser processing when carving by a laser having a reference output value a region, where the visually recognizable character string pattern 25 that indicates a set resistance value is to be formed, out of the surface of the resistive alloy plate 20 to form the character string pattern 25, and is obtained in advance through experimentation or the like.

In the laser processing step in the third manufacturing method, the surface area of the character string pattern on which laser processing should be performed is calculated according to the resistance value that should be changed and that is obtained based on the difference between the initial resistance value and the set resistance value and to the data concerning a changed resistance value/a character string pattern surface area, and the character string pattern 25 is formed so as to have the surface area by the laser having the reference output value.

According to the third manufacturing method as well, the shunt resistor 1 that has a desired set resistance value and is capable of reliably informing a user of the set resistance value can be reliably and efficiently manufactured.

DESCRIPTION OF THE REFERENCE NUMERALS

1 Shunt resistor
10 Electrode plate
20 Resistive alloy plate
25 Character string pattern

The invention claimed is:

1. A shunt resistor, comprising:
a pair of electrode plates spaced apart from each other in a plate surface direction; and
a resistive alloy plate that connects the pair of electrode plates and has a predetermined set resistance value, wherein
the resistive alloy plate is provided at a surface with a visually recognizable character string pattern formed by laser processing and the character string pattern indicates the set resistance value of the resistive alloy plate, and
a surface area and a carving depth of the character string pattern are set in such a manner that the resistive alloy plate has the set resistance value.

2. A method of manufacturing a shunt resistor that includes a pair of electrode plates spaced apart from each other in a plate surface direction and a resistive alloy plate that connects the pair of electrode plates and has a predetermined set resistance value, the method comprising:
providing a resistor material in which the pair of electrode plates are connected to each other via the resistive alloy plate;
measuring an initial resistance value of the resistive alloy plate;

carving a region via laser processing, where a visually recognizable character string pattern indicating the set resistance value is to be formed out of a surface of the resistive alloy plate so as to form the character string pattern, the laser processing being performed at such a laser output value that a carving depth is a predetermined reference depth;
measuring a character string pattern reference depth state resistance value of the resistive alloy plate that is in a state where the character string pattern has the reference depth;
calculating a reference changed resistance value of the resistive alloy plate that changes due to single reference output laser processing, based on the initial resistance value and the character string pattern reference depth state resistance value; and
performing reference depth laser processing only the necessary number of times calculated based on the reference changed resistance value and the difference between the character string pattern reference depth state resistance value and the set resistance value.

3. A method of manufacturing a shunt resistor that includes a pair of electrode plates spaced apart from each other in a plate surface direction and a resistive alloy plate that connects the pair of electrode plates and has a predetermined set resistance value, the method comprising:
providing a resistor material in which the pair of electrode plates are connected to each other via the resistive alloy plate;
measuring an initial resistance value of the resistive alloy plate;
calculating a laser output value capable of changing the resistance of the resistive alloy plate from the initial resistance value to the set resistance value, using data concerning a changed resistance value/a laser output that is provided for each of a plurality of expected set resistance values, wherein
the data indicates a relationship between a size of a changed resistance value of the resistive alloy plate that changes due to the laser processing performed to carve a region where a visually recognizable character string pattern indicating the set resistance value and having a set surface area is to be formed out of the surface of the resistive alloy plate so that the character string pattern is formed and a size of the laser output; and
performing laser processing with the laser having the calculated laser output value on the region where the character string pattern is to be formed.

4. A method of manufacturing a shunt resistor that includes a pair of electrode plates spaced apart from each other in a plate surface direction and a resistive alloy plate that connects the pair of electrode plates and has a predetermined set resistance value, the method comprising:
providing a resistor material in which the pair of electrode plates are connected to each other via the resistive alloy plate;
measuring an initial resistance value of the resistive alloy plate;
calculating a surface area of a character string pattern, which indicates the set resistance value in a visually recognizable manner, necessary for changing the resistance of the resistive alloy plate from the initial resistance value to the set resistance value by laser processing with a laser having a reference output value, using data concerning a changed resistance value/the character string pattern surface area that is provided for each of a plurality of expected set resistance values, wherein the data indicates a relationship between the surface area of the character string pattern and a size of the changed resistance value of the resistive alloy plate that changes due to laser processing that carves a region by a laser having a reference output value, where the visually recognizable character string pattern indicating the set resistance value is to be formed out of the surface of the resistive alloy plate so that the character string pattern is formed and forming the character string pattern by performing laser processing with the laser having the reference output value so that the character string pattern has the calculated surface area.

\* \* \* \* \*